United States Patent
Abraham et al.

(10) Patent No.: US 7,443,340 B2
(45) Date of Patent: Oct. 28, 2008

(54) METHOD AND APPARATUS FOR GENERATING AND DISTRIBUTING SATELLITE TRACKING INFORMATION

(75) Inventors: Charles Abraham, Los Gatos, CA (US); Frank van Diggelen, San Jose, CA (US); Matthew Riben, Cupertino, CA (US)

(73) Assignee: Global Locate, Inc., San Jose, CA (US)

( * ) Notice: Subject to any disclaimer, the term of this patent is extended or adjusted under 35 U.S.C. 154(b) by 194 days.

(21) Appl. No.: 11/333,787

(22) Filed: Jan. 17, 2006

(65) Prior Publication Data

US 2007/0260399 A1 Nov. 8, 2007

Related U.S. Application Data

(63) Continuation-in-part of application No. 09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820.

(51) Int. Cl.
*G01S 5/14* (2006.01)
*G01C 21/00* (2006.01)

(52) U.S. Cl. .................. 342/357.06; 701/226

(58) Field of Classification Search ............. None
See application file for complete search history.

(56) References Cited

U.S. PATENT DOCUMENTS

| | | |
|---|---|---|
| 4,445,118 A | 4/1984 | Taylor et al. |
| 4,894,662 A | 1/1990 | Counselman |
| 5,043,736 A | 8/1991 | Darnell et al. |
| 5,223,844 A | 6/1993 | Mansell et al. |
| 5,365,450 A | 11/1994 | Schuchman et al. |

(Continued)

FOREIGN PATENT DOCUMENTS

CA 2177310 12/1996

(Continued)

OTHER PUBLICATIONS

International Search Report mailed Jul. 10, 2007 for PCT Application No. PCT/US2007/001187.

(Continued)

*Primary Examiner*—Gregory C Issing
(74) *Attorney, Agent, or Firm*—McAndrews Held & Malloy Ltd.

(57) ABSTRACT

A method and apparatus for generating and distributing satellite tracking data to a remote receiver is disclosed. The method for includes extracting from satellite-tracking data initial model parameters representing a current orbit of at least one satellite-positioning-system satellite, computing an orbit model using the initial model parameters, wherein a duration of the orbit model is longer than a duration of the satellite-tracking data, comparing, for an overlapping period of time, the orbit model to the satellite-tracking data; and adjusting the orbit model to match the satellite tracking data for the overlapping period of time so as to form an adjusted orbit model. The adjusted orbit model comprises the long-term-satellite-tracking data.

21 Claims, 6 Drawing Sheets

U.S. PATENT DOCUMENTS

| | | | |
|---|---|---|---|
| 5,408,237 A | | 4/1995 | Patterson et al. |
| 5,417,217 A | | 5/1995 | Morita et al. |
| 5,418,537 A | | 5/1995 | Bird |
| 5,430,657 A | * | 7/1995 | Kyrtsos ............... 701/226 |
| 5,506,781 A | | 4/1996 | Cummiskey et al. |
| 5,589,833 A | | 12/1996 | Randall et al. |
| 5,663,735 A | | 9/1997 | Eshenbach |
| 5,673,256 A | | 9/1997 | Maine |
| 5,726,893 A | | 3/1998 | Schuchman et al. |
| 5,786,789 A | | 7/1998 | Janky |
| 5,828,336 A | * | 10/1998 | Yunck et al. ........... 342/357.02 |
| 5,841,396 A | | 11/1998 | Krasner |
| 5,845,227 A | | 12/1998 | Peterson |
| 5,877,724 A | | 3/1999 | Davis |
| 5,913,170 A | | 6/1999 | Wortham |
| 5,938,721 A | | 8/1999 | Dussell et al. |
| 5,943,014 A | | 8/1999 | Gilhousen |
| 5,963,167 A | | 10/1999 | Lichten et al. |
| 5,983,109 A | | 11/1999 | Montoya |
| 5,999,124 A | | 12/1999 | Sheynblat |
| 6,016,117 A | * | 1/2000 | Nelson, Jr. ............. 342/352 |
| 6,064,336 A | | 5/2000 | Krasner |
| 6,067,045 A | | 5/2000 | Castelloe et al. |
| 6,081,229 A | | 6/2000 | Soliman et al. |
| 6,084,544 A | | 7/2000 | Camp, Jr. |
| 6,085,128 A | * | 7/2000 | Middour et al. ............ 701/13 |
| 6,097,974 A | | 8/2000 | Camp, Jr. et al. |
| 6,107,960 A | | 8/2000 | Krasner |
| 6,121,923 A | | 9/2000 | King |
| 6,122,506 A | | 9/2000 | Lau et al. |
| 6,131,067 A | | 10/2000 | Girerd et al. |
| 6,133,874 A | | 10/2000 | Krasner |
| 6,134,483 A | | 10/2000 | Vayanos et al. |
| 6,150,980 A | | 11/2000 | Krasner |
| 6,178,195 B1 | | 1/2001 | Durboraw, III et al. |
| 6,188,351 B1 | | 2/2001 | Bloebaum |
| 6,204,808 B1 | | 3/2001 | Bloebaum et al. |
| 6,211,819 B1 | * | 4/2001 | King et al. ............. 342/357.09 |
| 6,215,441 B1 | | 4/2001 | Moeglein et al. |
| 6,215,442 B1 | | 4/2001 | Sheynblat et al. |
| 6,222,483 B1 | | 4/2001 | Twitchell et al. |
| 6,239,742 B1 | | 5/2001 | Krasner |
| 6,256,475 B1 | | 7/2001 | Vannucci |
| 6,272,316 B1 | | 8/2001 | Wiedeman et al. |
| 6,285,315 B1 | | 9/2001 | Pratt |
| 6,289,279 B1 | | 9/2001 | Ito et al. |
| 6,313,787 B1 | | 11/2001 | King et al. |
| 6,323,804 B1 | | 11/2001 | Kurby et al. |
| 6,369,751 B1 | | 4/2002 | Naruse |
| 6,377,585 B1 | | 4/2002 | Funderburk et al. |
| 6,411,892 B1 | | 6/2002 | van Diggelen |
| 6,411,899 B2 | | 6/2002 | Dussell et al. |
| 6,424,890 B1 | * | 7/2002 | Syrjarinne et al. ............ 701/13 |
| 6,433,735 B1 | | 8/2002 | Bloebaum et al. |
| 6,437,735 B1 | * | 8/2002 | McMahan ................ 342/357.1 |
| 6,453,237 B1 | | 9/2002 | Fuchs et al. |
| 6,542,820 B2 | | 4/2003 | LaMance et al. |
| 6,560,534 B2 | * | 5/2003 | Abraham et al. ............ 701/213 |
| 6,642,884 B2 | | 11/2003 | Bryant et al. |
| 6,693,882 B1 | | 2/2004 | Gu et al. |
| 6,725,159 B2 | | 4/2004 | Krasner |
| 6,799,116 B2 | | 9/2004 | Robbins |
| 6,813,560 B2 | | 11/2004 | van Diggelen et al. |
| 6,829,535 B2 | * | 12/2004 | van Diggelen et al. ...... 701/213 |
| 6,856,282 B2 | | 2/2005 | Mauro et al. |
| 7,020,555 B1 | | 3/2006 | Janky et al. |
| 2002/0032526 A1 | | 3/2002 | van Diggelen |
| 2002/0049536 A1 | | 4/2002 | Gaal |
| 2002/0172313 A1 | | 11/2002 | Smith et al. |
| 2002/0188403 A1 | * | 12/2002 | LaMance et al. ............ 701/213 |
| 2002/0198657 A1 | | 12/2002 | Robbins |
| 2003/0098810 A1 | | 5/2003 | Lee et al. |
| 2003/0212821 A1 | | 11/2003 | Gillies et al. |
| 2003/0223422 A1 | | 12/2003 | Igarashi et al. |
| 2004/0203853 A1 | | 10/2004 | Sheynblat |
| 2004/0203915 A1 | | 10/2004 | van Diggelen et al. |
| 2004/0263386 A1 | * | 12/2004 | King et al. ............. 342/357.06 |
| 2005/0003833 A1 | | 1/2005 | Younis |

FOREIGN PATENT DOCUMENTS

| | | |
|---|---|---|
| EP | 1197761 A | 4/2002 |
| GB | 2307812 A | 6/1997 |
| WO | WO-8912835 A1 | 12/1989 |
| WO | WO-9809181 A1 | 3/1998 |
| WO | WO-9919743 A1 | 4/1999 |
| WO | WO-0175473 A2 | 10/2001 |
| WO | W0-02/103383 | 12/2002 |

OTHER PUBLICATIONS

Written Opinion mailed Jul. 10, 2007 for PCT Application No. PCT/US2007/001187.

*PCT International Search Report of the International Searching Authority* mailed Aug. 23, 2003 for PCT Application No. PCT/US02/35311..

Cameron, M., et al., "Intelligent Transportation System Mayday Becomes a Reality", *Navsys Corporation*, IEEE 1985, 340-347.

Dietrich, F. J., "The Globalstar Cellular Satellite System", *IEEE Transaction on Amtennas and Propagation*, 46(6), Publisher item Identifier S 0018-926X(98), (Jun. 1998), 935-942.

Djuknic, Goran M., et al., "Geolocation and Assisted GPS", *Computer vol. 34, Issue 2*, (Feb. 2001), 123-125.

Johnson, LT Gregory W., "Communications Technologies for Automated Dependent Surveillance", *USCG Research & Development Center* (1995), 40-44.

Makino, H., "Development of Navigation System for the Blind Using GPS and Mobile Phone Combination", *18th Annual International Conference of the IEEE Engineering in Medicine and Biology Society*(1996), 506-507.

Sennott, Dr., J. W., "A High Performance Position Tracker for Embedded Paging, Cellular Telephone, and Law Enforcement Applications", *Department of Electrical and Computer Engineering and Technology, IEEE* 1992, 96-103.

Stewart, J. M., "Vehicle Location and Position Monitoring System Using Satellite Navigation and Cellular Telephone", *LITEF GmbH*, 7 & 1-15.

Sturza, M. A., "Architecture of the Teledesic Satellite System", *Teledesic Corporation*, 1-7.

Van Diggelen, Frank , "Global Locate Indoor GPS Chipset & Services", *JON GPS 2001*, Sep. 11-14, 2001, Salt Lake City, UT, USA, (Online) Sep. 11, 2001, pp. 1515-1521, XP002358532 Retrieved from the Internet: URL:http://ww.ion.org/:: (retrieved on Dec. 9, 2005).

Wheatley, C., "CDMA's Dependence on Good Timing and Related Issues", *IEEE International Frequency Control Symposium*, Qualcomm Incorporated (1996), 1211-1218.

Zhao, Y., "Efficient and Reliable Data Transmission for Cellular-and-GPS-Based Mayday Systems", *Motorola, Inc., Chicago Corporate Research Laboratories*, IEEE 1998, 555-559.

\* cited by examiner

| OTD FOR SATELLITE PRN 1, WEEK 1115 | | | | |
|---|---|---|---|---|
| TIME OF WEEK (SECONDS) | SATELLITE POSITION X (METERS) | SATELLITE POSITION Y (METERS) | SATELLITE POSITION Z (METERS) | SATELLITE CLOCK OFFSET (SECONDS) |
| 560400.0 | 15121 0924.3 | -6269504.8 | -20691762.4 | 0.000179304 09 |
| 560460.0 | 15333252.6 | -6166907.8 | -20632874.0 | 0.000179304 08 |
| 560520.0 | 15455578.4 | -6065020.3 | -20572383.0 | 0.000179304 08 |
| 560580.0 | 15577888.4 | -5963848.4 | -20510294.2 | 0.000179304 07 |
| 560640.0 | 15700169.1 | -5863397.7 | -20446612.6 | 0.000179304 07 |

FIG. 6

METHOD AND APPARATUS FOR GENERATING AND DISTRIBUTING SATELLITE TRACKING INFORMATION

CROSS-REFERENCE TO RELATED APPLICATIONS

This application is a continuation-in-part application of co-pending U.S. patent application Ser. No. 09/993,335, filed Nov. 6, 2001, which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542,820. This application contains subject matter that is related to U.S. patent application Ser. No. 09/715,860, filed Nov. 17, 2000, now U.S. Pat. No. 6,417,801. Each of the aforementioned related patents and/or patent applications is herein incorporated by reference.

BACKGROUND OF THE INVENTION

1. Field of the Invention

The present invention generally relates to generating satellite tracking information for earth orbiting satellites. More specifically, the invention relates to a method and apparatus for generating and distributing satellite tracking information through a network or communications link.

2. Description of the Related Art

A positioning receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as an ephemeris or ephemeris information. Each satellite broadcasts its own ephemeris once every 30 seconds. Once the GPS radio signal has been acquired, the process of computing position requires the use of the ephemeris information.

The broadcast ephemeris information is encoded in a 900 bit message within the GPS satellite signal. It is transmitted at a rate of 50 bits per second, taking 18 seconds in all for a complete ephemeris transmission. The broadcast ephemeris information is typically valid for 2 to 4 hours into the future (from the time of broadcast). Before the end of the period of validity the GPS receiver must obtain a fresh broadcast ephemeris to continue operating correctly and produce an accurate position. It is always slow (no faster than 18 seconds), frequently difficult, and sometimes impossible (in environments with very low signal strengths), for a GPS receiver to download an ephemeris from a satellite. For these reasons it has long been known that it is advantageous to send the ephemeris to a GPS receiver by some other means in lieu of awaiting the transmission from the satellite. U.S. Pat. No. 4,445,118, issued Apr. 24, 1984, describes a technique that collects ephemeris information at a GPS reference station, and transmits the ephemeris to the remote GPS receiver via a wireless transmission. This technique of providing the ephemeris, or equivalent data, to a GPS receiver has become known as "Assisted-GPS." Since the source of ephemeris in Assisted-GPS is the satellite signal, the ephemeris information remains valid for only a few hours. As such, the remote GPS receiver must periodically connect to a source of ephemeris information whether that information is received directly from the satellite or from a wireless transmission. Without such a periodic update, the remote GPS receiver will not accurately determine position.

The deficiency of the current art is that there is no source of satellite trajectory and clock information that is valid for longer than a few hours into the future, and it can be expensive to send the ephemeris information repeatedly to the many remote devices that may need it. Moreover, mobile devices may be out of contact from the source of the Assisted-GPS information when their current ephemeris becomes invalid.

Therefore, there is a need in the art for a method and apparatus for providing satellite trajectory and clock information that is valid for an extended period into the future, e.g., many days into the future.

SUMMARY OF THE INVENTION

The present invention is a method and apparatus for generating satellite tracking data (STD) that is valid for extend periods of time into the future, i.e., long term STD or LT-STD. The STD may contain future satellite trajectory information and/or satellite clock information. The STD is derived by receiving at one or more satellite tracking stations the signals from at least one satellite and determining satellite tracking information (STI) from the received signals. STI contains present satellite orbit trajectory data and satellite clock information.

The STD may be provided to a remote satellite signal receiver via a network or communications system. The satellite system may include the global positioning system (GPS), GLONASS, GALILEO, or other satellite systems that may use STD to enhance the performance of the receiver. By using the LT-STD, a remote receiver may accurately operate for days without receiving an update of the broadcast ephemeris information as normally provided from the satellites.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 depicts an example of a data table that could be used in an STD database.

DETAILED DESCRIPTION OF THE PREFERRED EMBODIMENT

Figure 1:
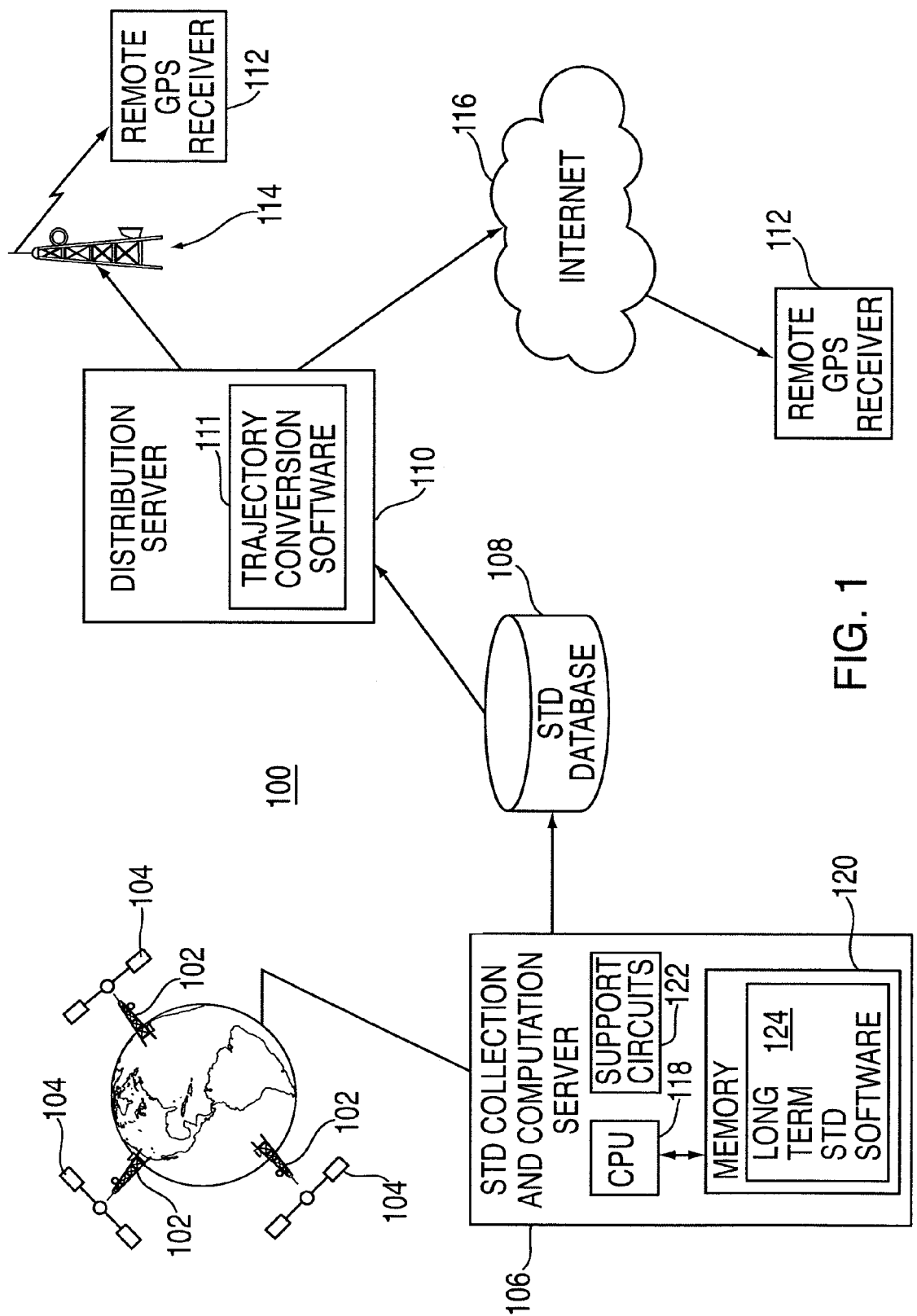
FIG. 1 depicts a system for creating and distributing satellite tracking data (STD) to remote GPS receivers.

FIG. 1 depicts a block diagram of a system 100 for creating and distributing satellite tracking data (STD). The satellite system may include the global positioning system (GPS), GLONASS, GALILEO, or other satellite systems that may use STD to enhance the performance of the receiver. The following disclosure uses GPS as an illustrative system within which the invention operates. From the following disclosure, those skilled in the art will be able to practice the invention in conjunction with other satellite systems.

A network of GPS tracking stations 102 is used to collect measurement data from the GPS satellites 104. Such a network is described in detail in U.S. patent application Ser. No. 09/615,105, filed Jul. 13, 2000. The network could comprise several tracking stations that collect satellite tracking information (STI) from all the satellites in the constellation, or a few tracking stations, or a single tracking station that only collects STI for a particular region of the world. An STD collection and computation server 106 collects and processes the measurement data (this measurement data is referred to herein as satellite tracking information (STI) that includes at least one of: code phase measurements, carrier phase measurements, Doppler measurements, or ephemeris data). In the preferred embodiment, measurement data is obtained from both the L1 and L2 frequencies on which the GPS satellites transmit. Alternative embodiments may use only one of these frequencies, and/or other frequencies used by other satellite systems or by future versions of the GPS system. The server 106 produces: 1) accurate satellite tracking data (STD) (e.g., a trajectory of each satellite and/or a clock offset measurement) during the data collection period, 2) a prediction of the future STD of each satellite, and 3) models that match the future STD of each satellite. The server 106 comprises a central processing unit (CPU) 118, support circuits 122, and memory 120. The CPU 118 may be any one of the many CPUs available on the market to perform general computing. Alternatively, the CPU may be a specific purpose processor such as an application specific integrated circuit (ASIC) that is designed to process satellite tracking information. The support circuits 122 are well known circuits such as clock circuits, cache, power supplies and the like. The memory 120 may be read only memory, random access memory, disk drive storage, removable storage or any combination thereof. The memory 120 stores executable software, e.g., LT-STD software 124, that, when executed by the CPU 118, causes the system 100 to operate in accordance with the present invention.

The set of satellite trajectory and clock data produced by the LT-STD software 124 constitutes the STD information, and is stored in an STD database 108. A distribution server 110 accesses the database 108 to gather the most recent set of data, formats the data using the trajectory conversion software 111 according to the relevant interface standard, and distributes the formatted data to GPS devices 112 that require satellite orbit information. The distribution process may be by some form of wireless communications system 114, or over the Internet 116, or a combination of both, or by some other means of communication. Once the GPS devices 112 have received the orbit data, they may operate continually for many days without needing to download fresh broadcast ephemeris from the satellites or from any other source. The orbit data distributed to the GPS devices may be in the same format as the broadcast ephemeris or may be some other model format that is defined by the GPS device. Herein this orbit data is generally referred to as a satellite tracking model (STM). The loading of the STM into the GPS receiver can be accomplished in many ways. Using the cradle for a personal digital assistant (PDA), direct connection to a network, or a wireless technology, such as Bluetooth or a cellular network, are a few examples of how the ephemeris data can be transferred to the receiver. The transmission is generally accomplished by broadcasting the LT-STD (or a model representing all or a portion of the LT-STD) without knowledge of the specific location of the GPS receiver. As such, the distribution server does not require the GPS receiver to send any information through the network to the distribution server.

Since GPS is a ranging system in and of itself, the data transmitted by the GPS satellites can be used to determine the range, range-rate and clock offsets to the GPS satellites from a set of tracking stations. This set of observations generated by the tracking stations 102 is used in the orbit determination process, and in the estimation of the satellite clock characteristics. The set of monitoring stations 102 could be a single station, a public network such as the Continuously Operating Reference System (CORS), or a privately owned and/or operated network.

Figure 2:
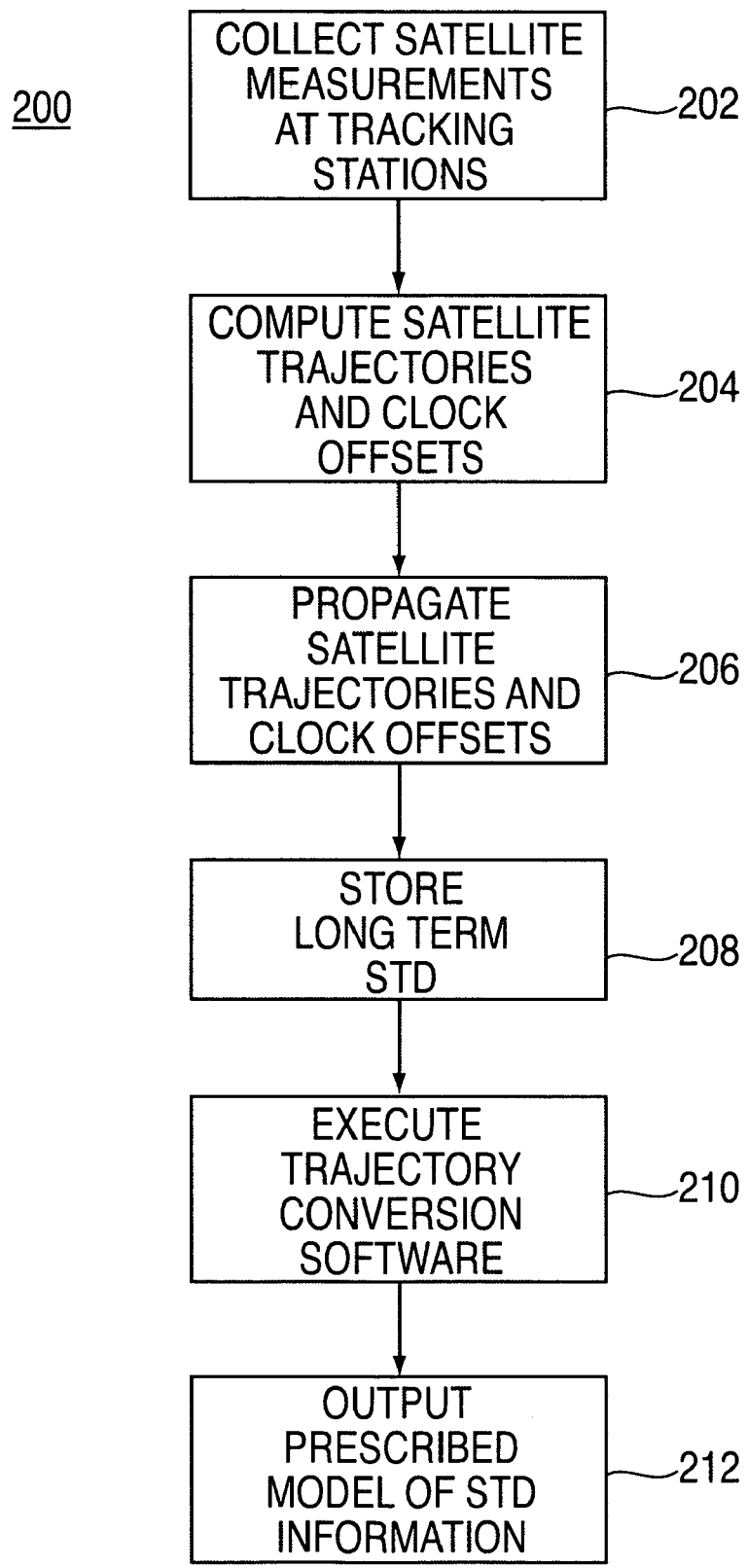
FIG. 2 depicts a method for forming the STD from the satellite measurements made at satellite tracking stations.

FIG. 2 illustrates the preferred embodiment of a process for computing LT-STD. The process begins at step 202 with the collection of satellite measurements from the network of tracking stations. Measurements such as code phase, (CP), carrier phase (CPH), and Doppler may be used for GPS satellite tracking information. At step 204, the measurements are used to compute the satellite trajectories and clock offsets over the periods during which the data was collected. This step is performed using standard GPS processing techniques and software packages well known in the art. Examples of this type of software are GIPSY from the Jet Propulsion Laboratory (JPL), GEODYN from NASA Goddard Space Flight Center (GSFC), and the commercial product, MicroCosm, from Van Martin Systems.

At step 206, the satellite trajectories and clock offsets from step 204 are propagated into the future with the same software package, using standard orbit models, such as gravity, drag, solar radiation pressure, tides, third body effects, precession, nutation, and other conservative and non-conservative forces effecting the satellite trajectory. These are normally the same force models that are used in the estimation of the satellite orbits during the data fit interval. A subset of these models, such as those for drag and solar radiation pressure, are adjusted during the orbit estimation process described in step 204 to best fit the trajectory. This combination of known and estimated force models parameters is used in the propagation 206 to provide the propagated orbit for time outside the data fit interval. The clock offsets for GPS satellites are typically very small, and change linearly over time. These clock offsets are propagated into the future using standard models, such as a second order model containing clock offset, drift, and drift rate.

At step 208, the propagated satellite trajectories and/or clock offsets are stored as STD in a database. At step 210, the trajectory conversion software converts the LT-STD data into a model and format expected by the GPS device to which the model is to be provided. At step 212, the prescribed model or information is output. For use with existing GPS receivers, the preferred embodiment of the model is the GPS ephemeris model as described in ICD-GPS-200 and an ephemeris model is generated from the LT-STD for each 4 hour period as illustrated in the timeline 300 of FIG. 3, i.e., a different model 301, 302 and so on is generated for each six hour period. As such, the plurality of models 301, 302 and so on cumulatively span the length of the available LT-STD.

In an alternate embodiment, at step 204 (FIG. 2), the satellite trajectories and clock offsets may be estimated using the data broadcast by the satellites and the standard equations given in ICD-GPS-200c.

The orbit model is a mathematical representation of the satellite trajectory that describes the trajectory as a function of a small number of variables and eliminates the need to provide satellite position vectors explicitly as a table of time vs. satellite positions. An example of an ephemeris model is the classic six element Keplerian orbital model. Although this model lacks long term accuracy, it is a functional ephemeris model for providing satellite trajectory information as a function of a small number of variables. In the preferred embodiment, the model used to describe the trajectory is GPS standard ephemeris, specified in ICD-GPS-200c, following the same conventions and units. This is the preferred method to provide maximum compatibility with existing GPS receivers. However, other orbit models could also be used to represent the satellite trajectory. Orbit models can be selected to provide increased accuracy, longer duration fits, more compact representation of the trajectory, or other optimizations required in an application.

This invention is different from the current art in that the orbit model provided to the GPS device is not the ephemeris data broadcast by the GPS satellites. Current art downloads the ephemeris broadcast from the GPS satellites and retransmits that data to GPS devices. In this invention, the broadcast ephemeris data is not required at any stage and is not used in the preferred implementation.

The broadcast ephemeris data provided by the GPS satellites cover a specific time period (typically 4 hours) and the end of that time the information becomes unusable. For example, if a device receives a broadcast ephemeris that will expire in 5 minutes, the device would need the new broadcast ephemeris before operating outside that 5 minute interval. With this invention, the STD may be formatted for the time period required by the device. This time period may be for the current time forward or may be for some time interval in the future. For example, a device may request orbit information in the standard GPS ephemeris format for the current time. In this case, the ephemeris provided to the device would be valid for the next 6 hours. The device could request orbit information for the next 12 hours in the standard GPS format which could be supplied as two six hour ephemeris orbit models. In addition, different orbit models and formats that support different accuracies and standards can be generated from the LT-STD.

Fitting the LT-STD to the desired orbit model can be accomplished in a number of mathematical methods. The preferred embodiment is a least-squares fit of the orbit model parameters to the trajectory data. Other methods, such as Kalman filters or other estimators can also be used to obtain the orbit model parameters that best fit the trajectory data. These techniques of fitting data to orbit models are well known to people skilled in the art of orbit determination and orbit modeling.

Figure 4:
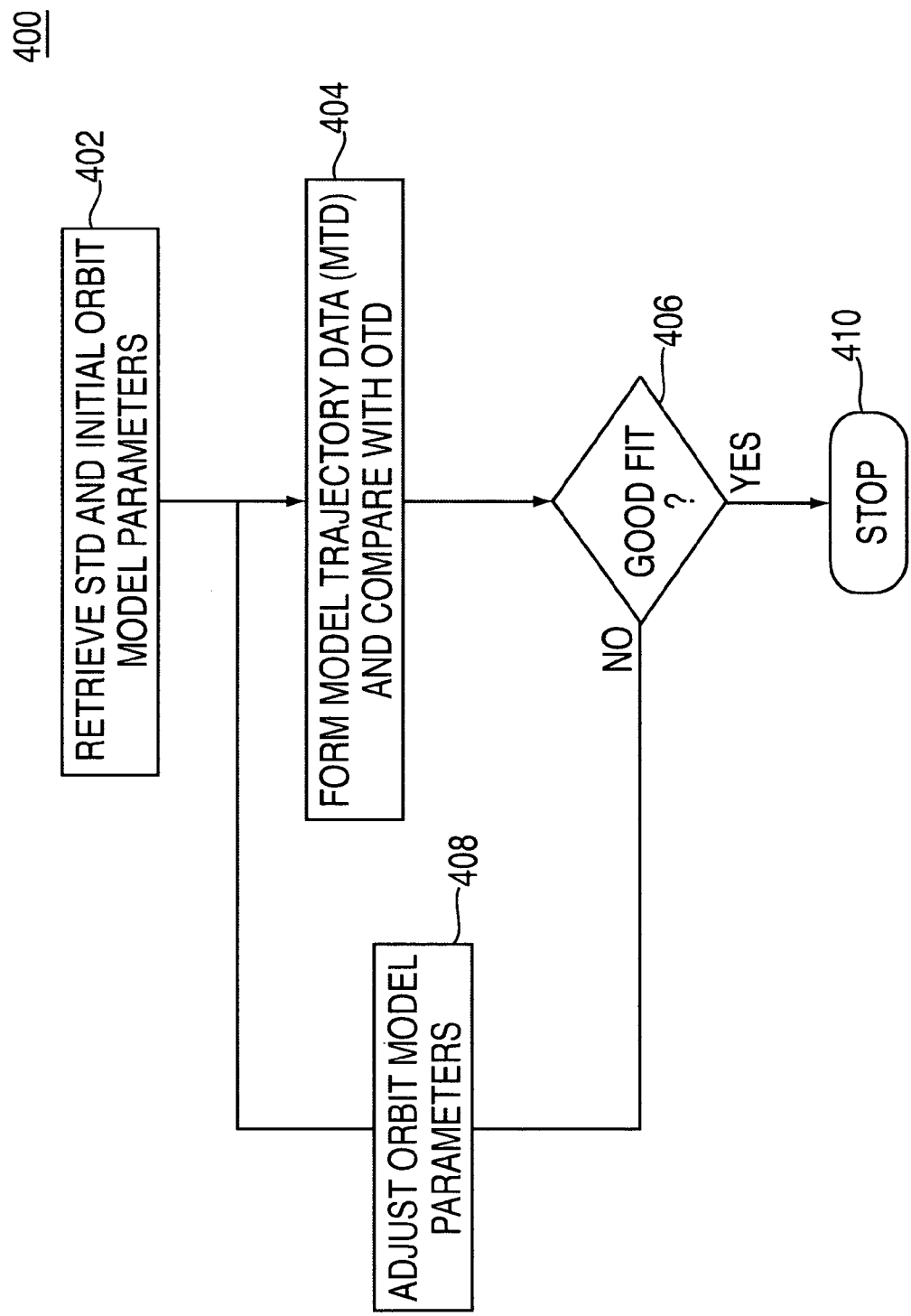
FIG. 4 depicts a flow diagram of a method that uses a least squares estimation technique to update parameters in an orbit trajectory model.

The least squares technique provides an optimal fit of the trajectory data to the orbit model parameters. FIG. 4 depicts a flow diagram of a method of generating an orbit model using a least squares estimation technique. One embodiment of LT-STD is a table representation of time, position, and clock offset for each satellite, as shown in FIG. 6. The time, position, and clock offset can be in any time/coordinate system. For the purpose of simplicity and illustration, the time/coordinate system is GPS time and Earth-Centered-Earth-Fixed (ECEF) position in the World Geodetic Survey 1984 (WGS-84) reference frame.

At step 402, the STD for the desired time interval is extracted from the STD database. The orbit model parameters are initialized to the orbit model values obtained by a similar process for the previous interval. This guarantees that the initial orbit model parameters are a good fit at least for the beginning of the desired time interval. The rest of the process 400 will ensure that the parameters are adjusted so that they become a good fit for the entire time interval.

In the preferred embodiment there are 15 orbital parameters to be adjusted:
  Square root of semi-major axis (meters^½)
  Eccentricity (dimensionless)
  Amplitude of sine harmonic correction term to the orbit radius (meters)
  Amplitude of cosine harmonic correction term to the orbit radius (meters)
  Mean motion difference from computed value (radians/sec)
  Mean anomaly at reference time (radians)
  Amplitude of cosine harmonic correction term to the argument of latitude (radians)
  Amplitude of sine harmonic correction term to the argument of latitude (radians)
  Amplitude of cosine harmonic correction term to the angle of inclination (radians)
  Amplitude of sine harmonic correction term to the angle of inclination (radians)
  Longitude of ascending node of orbit plane at weekly epoch (radians)
  Inclination angle at reference time (radians)
  Rate of inclination angle (radians/sec)
  Argument of perigee (radians)
  Rate of right ascension (radians/sec)

Although it will be readily apparent that more terms may be used, for better fits, or, fewer terms may be used for a more compact model.

At step 404, the orbit model is used to predict what the trajectory would be, the predicted data is denoted the "Model Trajectory Data" (MTD). If the model were perfect, the MTD would coincide exactly with the STD. At step 406, the MTD and OTD are compared to see how closely the orbit model fits the orbit data. In the preferred embodiment, the comparison step 406 is performed by summing the squares of the differences between each trajectory point in the OTD and the corresponding point in the MTD, and comparing the resulting sum to a threshold. If the fit is "good", the model parameters are deemed "good" and the process stops at step 410. If the fit is not good then the model parameters are adjusted at step 408. There are many techniques well known in the art for adjusting model parameters to fit data. For example, in FIG. 5, the six-hour ephemeris model was adjusted to fit six hours of OTD using a subspace trust region method based on the interior-reflective Newton method described in Coleman, T. F., and Y. Li, "On the convergence of reflective Newton methods for large scale nonlinear minimization subject to bounds", *Mathematical Programming*, Vol. 67, Number 2, pp. 189-224, 1994, and Coleman, T. F., and Y. Li, "An interior, trust region approach for nonlinear minimization subject to bounds", *SIAM Journal on Optimization*, Vol. 6, pp. 418-445, 1996. There are standard computer packages, e.g., MATLAB Optimization Toolbox, that may be used to implement these methods.

Steps 404, 406 and 408 are repeated until the model parameters are found that fit the OTD well.

Figure 3:
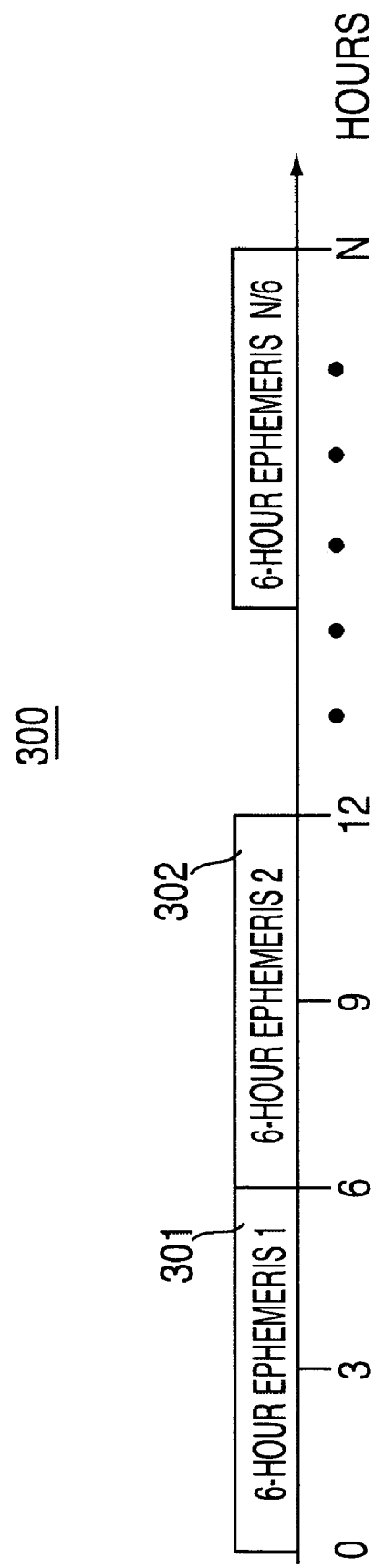
FIG. 3 depicts a timeline of STD data that conforms to the broadcast ephemeris format models as described in ICD-GPS-200C yet spans many hours.

When fitting an orbit model to trajectory data, there are many choices of which orbit model to choose. The preferred embodiment is to use orbit models with parameters that have been defined in well-known standards. In one embodiment, the ephemeris parameters defined in the GPS interface control document, ICD-GPS-200c, are used. The ICD-GPS-200c definition includes a bit that specifies a 4-hour fit or a 6-hour fit. Typically, the satellite data is broadcast in 4-hour fits and, by the time this data is obtained by the observer of the satellite, the data is often near the end of its fit interval. In one embodiment of the current invention, sequential 6 hour windows of STD are used to create 6-hour ephemeris models, using the technique described in FIG. 4 and the accompanying text. This produces a set of ephemeris models as illustrated in FIG. 3. Although these particular 6-hour models are not available without this invention, the models nonetheless are defined using standard parameters (i.e. ICD-GPS-200c) and will be understood by any device that was designed to be compatible with said standard.

Alternatively, the transmission time for the model may be dynamically determined in response to various transmission network characteristics, e.g., cellular telephone rate structures, data transmission bandwidths, low network utilization periods, low network congestion periods and the like. Thus, the invention determines present value of the specific characteristics and compares the present value to a threshold. In response to the comparison, the invention will transmit or not transmit the model. For example, the invention may monitor the network traffic and determine the least congested time to transmit the model. Many wireless networks have time varying rates. For example, cellular telephone use is often less expensive on weekends compared to mid-week rates. A useful embodiment of the current invention is to create a satellite tracking model that is valid for the period between inexpensive rates (example: valid from one Saturday to the next), and transmit the model during the time that the rate is inexpensive. As such, the model is transmitted for less cost than if the models were transmitted during a peak rate period. Also, or as an alternative, one may define and send the model to coincide with periods of low data use on the network—whether the network is wireless or not (e.g. the internet). Those skilled in the art will realize that many other transmission time optimization characteristics can be used to determine when it is best to transmit the model to the receiver(s).

Figure 5:
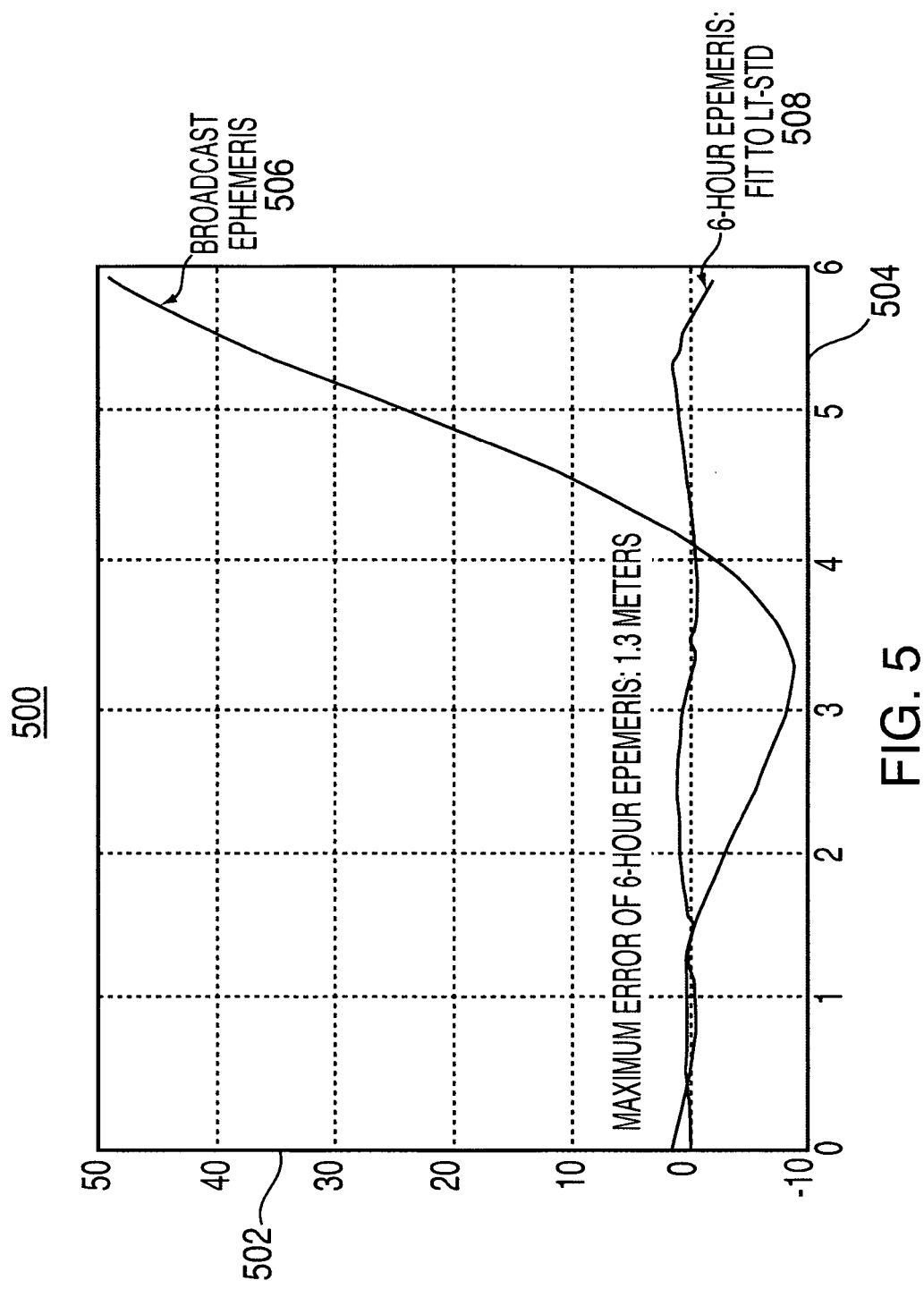
FIG. 5 depicts the error in the orbit model derived from the STD, and compares the error to the error in the broadcast ephemeris.

FIG. 5 shows an example of Satellite Tracking Data (STD) that was generated for a time interval of greater than six hours. Then, using the technique described by FIG. 4 and accompanying text, parameters of an ICD-GPS-200c ephemeris model were adjusted to give a best fit to 6 hours of the STD. The orbit modeled by this 6-hour ephemeris was then compared to the true trajectory, and for comparison, the true trajectory was also compared to the orbit modeled by the broadcast ephemeris. The results are shown in FIG. 5, illustrating how the broadcast ephemeris loses validity while the ephemeris created by this invention maintains its validity with approximately one meter of error.

The clock offset of GPS satellites is easily modeled by three parameters. In the preferred embodiment, the measured clock offset is modeled by the three parameters defined in ICD-GPS-200c. These parameters represent clock offset, drift, and drift rate. The parameters are adjusted in a similar way to the method 400 described above to give a model that best fits the measured data over the time interval.

Alternative embodiments may use longer fit intervals, such as 8, 14, 26, 50, 74, 98, 122, or 146 hours for each ephemeris model. These fit intervals are envisaged in ICD-GPS-200c, but are seldom, if ever, available from the broadcast ephemeris. Under the current invention, models with these fit intervals may be generated even when the broadcast ephemeris is limited to a 4-hour fit interval.

Alternative embodiments of the STD data may include observed satellite velocity, acceleration, clock drift, or clock drift rate and these terms may be used in the process of fitting a model in ways which are well known in the art.

Another embodiment of an orbit model uses the spare data bits in the current ephemeris format of a conventional GPS signal to provide additional model parameters that would improve the data fit over long time intervals. For example, subframe 1 has 87 spare bits that are available for additional parameters. This technique allows for more parameters to describe the orbital motion of the satellites without compromising the standard data format. This new ephemeris model is based on the current ephemeris model with additional correction terms used to augment the model to support the longer fit intervals with greater accuracy.

Yet another embodiment of an orbit model is to develop a new set of orbital parameters that describe the satellite orbit which are different, in part or in their entirety, from the GPS ephemeris model parameters. With the goal of making the fit interval longer, different parameters may provide a better description of the satellite orbit. This new set of parameters could be defined such that they would fit into the existing data structures, however, their implementation and algorithms for use would be different.

Still a further embodiment of an orbit model would be to develop a new set of orbital parameters that would not fit into the existing GPS ephemeris model format. This new set of parameters would be developed to better address the trade-off between the number of parameters required, the fit interval, and the orbit accuracy resulting from the model. An example of this type of ephemeris parameter set is Brouwer's theory that could be used as is or modified to account for GPS specific terms. Brouwer's theory as described in Brouwer, D. "Solution of the Problem of Artificial Satellite Theory without Drag", Astron J. 64: 378-397, November 1959 is limited to satellites in nearly circular orbits such as GPS satellites.

Another embodiment is to use a subset of the standard ephemeris parameters defined in ICD-GPS-200c. This approach is particularly useful when bandwidth and/or packet size is limited in the communication link that will be used to convey the orbit model to the Remote GPS Receiver. In one such embodiment, the fifteen orbit parameters described above, and in ICD-GPS-200c, may be reduced to a subset of 9 parameters, by setting all harmonic terms in the model to zero:

Square root of semi-major axis (meters^½)
Eccentricity (dimensionless)
Mean motion difference from computed value (radians/sec)
Mean anomaly at reference time (radians)
Longitude of ascending node of orbit plane at weekly epoch (radians)
Inclination angle at reference time (radians)
Rate of inclination angle (radians/sec)
Argument of perigee (radians)
Rate of right ascension (radians/sec)

Process 400 is then executed using this subset of parameters. This reduces the amount of data that must be sent to the Remote GPS Receiver. The receiver can then reconstruct a standard ephemeris model by setting the "missing" harmonic terms to zero. There are a large number of alternative embodiments to reduce the size of the data, while still providing a model that fits the STD, including:

Removing parameters from the model, and replacing them with a constant, such as zero—as done above—or some other predetermined value, which is either stored in the Remote GPS Receiver or occasionally sent to the receiver.

The resolution of the parameters may be restricted in the process 400, this too reduces the amount of data that must be sent to the mobile GPS receiver.

Parameters, which are similar among two or more satellites, may be represented as a master value plus a delta, where the delta requires fewer bits to encode; an example of this is the parameter Eccentricity, which changes very little among different GPS satellites.

Some of these approaches reduce the ability of the model to fit the data over a period of time (e.g., six hours). In this case, the fit interval may be reduced (e.g. to four hours) to compensate.

While the foregoing is directed to the preferred embodiment of the present invention, other and further embodiments of the invention may be devised without departing from the basic scope thereof, and the scope thereof is determined by the claims that follow.

The invention claimed is:

1. A method for creating long-term-satellite-tracking data, the method comprising:
   a) extracting from satellite-tracking data parameters representing current movements of at least one satellite-positioning-system satellite;
   b) computing a model using the parameters, wherein the model models the movements of the at least one satellite-positioning-system satellite longer than the satellite-tracking data;
   c) comparing, for an overlapping period of time, the model to the satellite-tracking data; and
   d) adjusting the model to match the satellite tracking data for the overlapping period of time so as to form an adjusted model, wherein the adjusted model comprises the long-term-satellite-tracking data.

2. The method of claim 1, further comprising:
   iterating c) and d) until an error produced by c) is less than a threshold.

3. The method of claim 1, wherein c) comprises:
   determining at least one difference between at least one point in the orbit model and at least one point in the satellite-tracking data;
   squaring the at least one difference to form a square of the at least one difference;
   summing the square of the at least one difference to form at least one resulting sum; and
   comparing the at least one resulting sum to a threshold.

4. The method of claim 3, further comprising:
   iterating c) and d) in view of comparing the at least one resulting sum to a threshold.

5. The method of claim 1, wherein the duration the model is four hours, and wherein the duration of the adjusted model is more than four hours.

6. The method of claim 5, wherein the duration of the adjusted model is six hours.

7. The method of claim 1, wherein d) further comprises:
   using a subspace trust region method based on the interior-reflective Newton method.

8. The method of claim 1, wherein the model comprises at least one of:
   square root of a semi-major axis, eccentricity, amplitude of a sine harmonic correction term to an orbit radius, amplitude cosine harmonic correction term to an orbit radius, mean motion difference, mean anomaly at a reference time, amplitude of a cosine harmonic correction to an argument of latitude, amplitude of a sine harmonic correction to the argument of latitude, amplitude of a cosine harmonic correction to an argument of inclination, amplitude of a sine harmonic correction to the argument of inclination, longitudinal of an ascending node of an orbit plane at a weekly epoch, inclination angle at a reference time, rate of inclination angle, and rate of right ascension and argument of perigee.

9. The method of claim 1, wherein the model comprises a mathematical representation of a satellite trajectory.

10. The method of claim 1, further comprising:
    receiving the satellite-tracking data from a worldwide-reference network, wherein the worldwide-reference network comprises a plurality of satellite-signal receivers.

11. A apparatus for creating long term satellite tracking data, the apparatus comprising:
    memory having stored therein executable instructions;
    a processor operable to execute the executable instructions to:
    a) extract from satellite-tracking data parameters representing current movements of at least one satellite-positioning-system satellite;
    b) compute a model using the parameters, wherein the model models the movements of the at least one satellite-positioning-system satellite longer than the satellite-tracking data;
    c) compare, for an overlapping period of time, the model to the satellite-tracking data; and
    d) adjust the model to match the satellite tracking data for the overlapping period of time so as to form an adjusted model, wherein the adjusted model comprises the long term satellite tracking data.

12. The apparatus of claim 11, wherein the processor is further operable to execute the executable instructions to:
    iterate c) and d) until an error produced by c) is less than a threshold.

13. The apparatus of claim 12, wherein the executable instructions to c) comprise executable instructions to:
    determine at least one difference between at least one point in the orbit model and at least one point in the satellite-tracking data;
    square the at least one difference to form a square of the at least one difference;
    sum the square of the at least one difference to form at least one resulting sum; and
    compare the at least one resulting sum to a threshold.

14. The apparatus of claim 13, wherein the processor is further operable to execute the executable instructions to:
    iterate c) and d) in view of executing the executable instructions to compare the at least one resulting sum to a threshold.

15. The apparatus of claim 11, wherein the duration the model is four hours, and wherein the duration of the adjusted model is more than four hours.

16. The apparatus of claim 15, wherein the duration of the adjusted model is six hours.

17. The apparatus of claim 11, wherein the executable instructions to d) comprise executable instruction to:
    use a subspace trust region method based on the interior-reflective Newton method.

18. The apparatus of claim 11, wherein the orbit model comprises at least one of:
    square root of a semi-major axis, eccentricity, amplitude of a sine harmonic correction term to an orbit radius, amplitude cosine harmonic correction term to an orbit radius, mean motion difference, mean anomaly at a reference time, amplitude of a cosine harmonic correction to an argument of latitude, amplitude of a sine harmonic correction to the argument of latitude, amplitude of a cosine harmonic correction to an argument of inclination, amplitude of a sine harmonic correction to the argument of inclination, longitudinal of an ascending node of an orbit plane at a weekly epoch, inclination angle at a reference time, rate of inclination angle, and rate of right ascension and argument of perigee.

19. The apparatus of claim 11, wherein the model comprises a mathematical representation of a satellite trajectory.

20. The apparatus of claim 11, wherein the processor is further operable to execute executable instructions to:

receive the satellite-tracking data from a worldwide-reference network, wherein the worldwide-reference network comprises a plurality of satellite-signal receivers.

21. An apparatus for creating long term satellite tracking data, the apparatus comprising:

a processor operable to execute executable instructions;

memory having stored therein executable instructions, wherein execution of the executable instructions by the memory by the processor causes:

a) extract from satellite-tracking data parameters representing current movements of at least one satellite-positioning-system satellite;

b) compute a model using the parameters, wherein the model models the movements of the at least one satellite-positioning-system satellite longer than the satellite-tracking data;

c) compare, for an overlapping period of time, the model to the satellite-tracking data; and d) adjust the model to match the satellite tracking data for the overlapping period of time so as to form an adjusted model, wherein the adjusted model comprises the long term satellite tracking data.

* * * * *